United States Patent [19]

Baba et al.

[11] Patent Number: 5,328,203
[45] Date of Patent: Jul. 12, 1994

[54] INFLATOR MOUNTING STRUCTURE FOR A PASSENGER'S AIR BAG SYSTEM

[75] Inventors: Yoshiyuki Baba; Masato Tagawa, both of Shiga, Japan

[73] Assignee: Takata Corporation, Tokyo, Japan

[21] Appl. No.: 34,808

[22] Filed: Mar. 19, 1993

[30] Foreign Application Priority Data

Mar. 30, 1992 [JP] Japan .................. 4-074096

[51] Int. Cl.$^5$ ............................ B60R 21/22
[52] U.S. Cl. ...................... 280/728 A; 16/2; 280/732
[58] Field of Search .......... 280/728 R, 728 A, 730 R, 280/731, 732, 734, 736, 741; 285/162, 215, 216; 248/56; 16/2

[56] References Cited

U.S. PATENT DOCUMENTS

| | | | |
|---|---|---|---|
| 1,697,814 | 1/1929 | Forbes | 248/56 |
| 2,736,018 | 2/1956 | Samson | 16/2 |
| 3,539,200 | 11/1970 | Chute | 280/731 |
| 4,153,273 | 5/1979 | Risko | 280/728 A |
| 4,370,930 | 2/1983 | Strasser et al. | 280/741 |
| 4,394,033 | 7/1983 | Goetz et al. | 280/736 |
| 5,069,480 | 12/1991 | Good | 280/728 A |

FOREIGN PATENT DOCUMENTS

| | | | |
|---|---|---|---|
| 270534 | 2/1914 | Fed. Rep. of Germany | 285/215 |
| 555302 | 8/1943 | United Kingdom | 248/56 |
| 1301623 | 1/1973 | United Kingdom . | |

*Primary Examiner*—Karin L. Tyson
*Attorney, Agent, or Firm*—Kanesaka & Takeuchi

[57] ABSTRACT

An inflator mounting structure for a passenger's air bag system is formed of an inflator having a cylindrical body portion charged with a gas producing agent, and a retainer retaining the inflator therein and having an opening in its side for inserting the inflator thereinto. Further included is a bushing made of a resin or rubber and interposed between the inner circumference of the opening of the retainer and the outer circumference of the inflator.

2 Claims, 2 Drawing Sheets

INFLATOR MOUNTING STRUCTURE FOR A PASSENGER'S AIR BAG SYSTEM

BACKGROUND OF THE INVENTION

1. Field of the Invention

The present invention relates to an inflator mounting structure for a passenger's air bag system and, more particularly, to a structure having a cylindrical inflator fixed in a retainer.

2. Description of the Related Art

An inflator mounting structure for a passenger's air bag system according to the prior art will be described with reference to FIG. 2.

In the passenger's air bag system, as designated at 10, an air bag 14 is folded in a retainer 12, which has its front opening covered with a lid 16. An inflator 18 is disposed at the back of the retainer 12. Numeral 20 designates a partition plate which is made of a punched metal for allowing gases to pass therethrough.

A retainer 12 is formed with a first opening 22 at its one side face and a second opening 24 in its other side. Into the first opening 22, there is inserted a shaft portion 26 at the leading end of an inflator 18. By fastening a nut 30 on the external thread formed in the shaft portion 26, the inflator 18 is fixed in the retainer 12.

The inflator 18 has its rear end fitted loosely in the second opening 24. This second opening 24 is formed to admit the inflator 18 thereby to insert the shaft portion 26 into the first opening 22 when the inflator 18 is to be mounted in the retainer 12.

Due to the gap between the inner circumference of the second opening 24 and the outer circumference of the rear end of the inflator 18, the inflator mounting structure of the prior art described above has a problem that an abnormal noise is caused when the rear end of the inflator 18 abuts against the inner circumference of the second opening 24.

OBJECT AND SUMMARY OF THE INVENTION

An object of the present invention is to prevent the abnormal noise from being caused when the inflator abuts against the inner circumference of the retainer opening.

According to a first aspect of the present invention, there is provided an inflator mounting structure for a passenger's air bag system, comprising: an inflator having a cylindrical body portion charged with a gas producing agent; and a retainer retaining the inflator therein and having an opening in its side for inserting the inflator thereinto. A bushing made of at least one of a resin and rubber is interposed between the inner circumference of the opening of the retainer and the outer circumference of the inflator.

According to a second aspect of the present invention, in the inflator mounting structure for a passenger's air bag system of the first aspect, the bushing has such a heat softening property that it is softened by the heat which comes from a fire to the air bag system.

According to the inflator mounting structure for a passenger's air bag system of the present invention, the direct contact between the inflator and the second opening is prevented together with the resultant abnormal noise.

According to the inflator mounting structure for a passenger's air bag system of the second aspect, the bushing softens to allow the gases to flow out of the retainer when the air bag system encounters a fire. As a result, even if the inflator is ignited by the heat of the fire, the gases produced could be promptly released to the outside of the retainer. Thus, it is possible to prevent the rise of the internal pressure in the air bag when the air bag is extended at the time of the fire.

DESCRIPTION OF THE PREFERRED EMBODIMENTS

Figure 1:
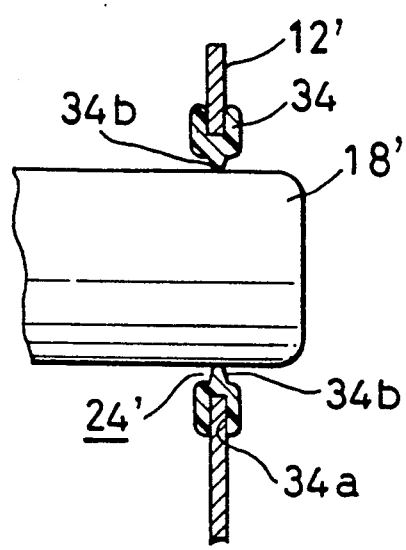
FIG. 1 is a section showing an essential portion of an inflator mounting structure of a passenger's air bag system according to an embodiment of the present invention.
Figure 2:
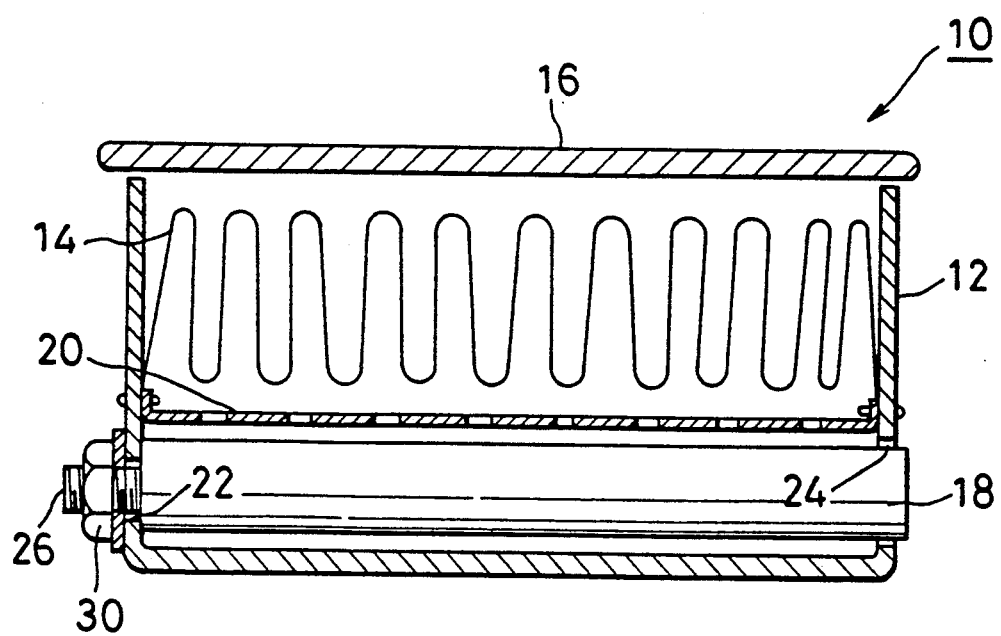
FIG. 2 is a section showing a passenger's air bag system according to the prior art.

FIG. 1 is a section showing an essential portion of an inflator mounting structure of a passenger's air bag system according to an embodiment of the present invention. In the present embodiment, a heat softening bushing 34 is interposed between the inner circumference of a second opening 24' of a retainer 12' and the outer circumference of an inflator 18'. In the present embodiment, the bushing 34 is made of polypropylene. This bushing 34 is slitted at 34a in its outer circumference and is fitted in the opening 24'. The bushing 34 has its inner circumference formed with a lip 34b which is in close contact with the outer circumference of the inflator 18'.

Thanks to provision of that bushing 34, the inflator 18' and the inner circumference of the opening 24' are kept away from direct contact to prevent abnormal noise.

If the air bag system thus constructed encounters a fire, the inflator 18' is energized to produces gases. Then, the bushing 34 is softened by the heat of the fire so that the gases discharged from the inflator 18' flow out of the retainer 12' through the clearance between the inflator 18' and the inner circumference of the opening 24'. As a result, the rise of the internal pressure in the air bag can be damped when the air bag is inflated at the time of a fire.

Figure 3:
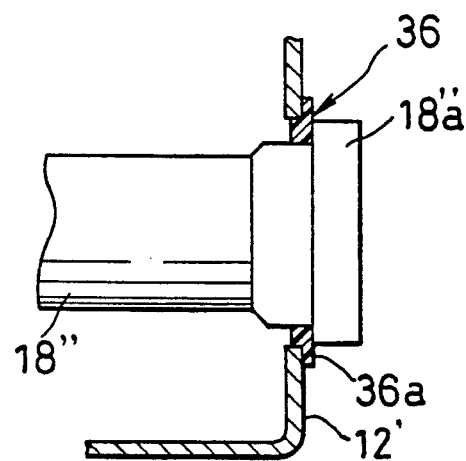
FIG. 3 is a section showing an essential portion of an inflator mounting structure of a passenger's air bag system according to another embodiment of the present invention.
Figure 4:
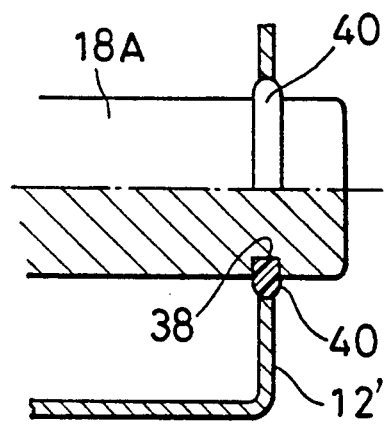
FIG. 4 is a section showing an essential portion of an inflator mounting structure of a passenger's air bag system according to still another embodiment of the present invention.
Figure 5:
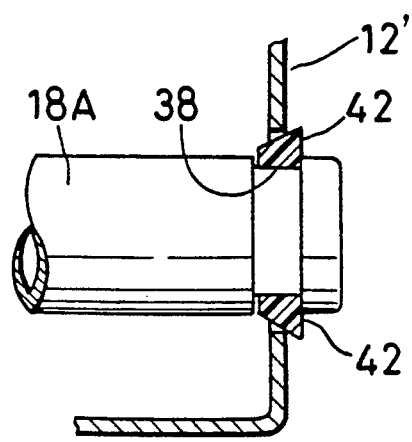
FIG. 5 is a section showing an essential portion of an inflator mounting structure of a passenger's air bag system according to a further embodiment of the present invention.

FIGS. 3 to 5 are sections showing essential portions of inflator mounting structures of a passenger's air bag system according to other embodiments of the present invention. In the embodiment of FIG. 3, a bushing 36 is formed with a flanked portion 36a which is lapped over the outer edge of the retainer 12'. Reference numeral 18a" designates a flanked portion which is formed at the rear end portion of an inflator 18". The flanked portion 18a" pushes the flanked portion 36a of the bushing 36 onto the edge portion of the retainer 12'.

In the embodiment of FIG. 4, an inflator 18A is formed on its outer circumference with a circumferential groove 38, in which is fitted a bushing 40. This bushing 40 has its outer circumference formed to have a semicircular section.

In the embodiment of FIG. 5, a bushing 42 has its outer circumference tapered to easily come into close contact with the inner circumference of the retainer 12'.

According to the inflator mounting structure of the passenger's air bag system of the present invention, as described above, it is possible to eliminate the abnormal noises which might otherwise be caused by the direct contact between the inflator and the inner circumference of the opening of the retainer.

According to the inflator mounting structure of the passenger's air bag system of the present invention, it is possible to damp the rise of the internal pressure in the air bag when the vehicle encounters a fire. In case the air bag is to extend at the time of a fire, this extending pressure is considerably low.

What is claimed is:

1. An inflator mounting structure for a passenger's air bag system, comprising:
   an inflator having a cylindrical body portion, a gas producing agent retained in the body portion, and fixing means attached to one side of the body portion,
   a retainer for retaining the inflator therein, said retainer having first and second side walls situated opposite to each other, a first opening formed in the first side wall for allowing the fixing means of the inflator to pass therethrough so that the inflator is fixed to the first side wall of the retainer by the fixing means, and a second opening formed in the second side wall opposite to the first opening, said second opening having a size greater than that of the body portion of the inflator, and
   a circular bushing made of at least one of a resin and rubber and having a heat softening property so that the bushing is softened by heat due to fire near the inflator, said circular bushing having a bifurcated portion with a groove at an outer periphery thereof so that the second side wall of the retainer is inserted in the groove to securely hold the circular bushing therein, and a lip extending inwardly toward a center of the circular bushing from the bifurcated portion, said lip being tapered toward the center of the circular bushing and having a shape of trapezoid in cross section and an inner size substantially the same as an outer diameter of the cylindrical body portion of the inflator so that the circular bushing closely contacts and supports the cylindrical body portion of the inflator, and in case of fire, allows gas of the inflator to exhaust from an inside of the retainer to an outside through a portion between the cylindrical body portion of the inflator and the lip.

2. An inflator mounting structure according to claim 1, wherein said bushing is made of polypropylene.

* * * * *